United States Patent [19]

Lissel et al.

[11] Patent Number: 5,768,131
[45] Date of Patent: Jun. 16, 1998

[54] COMPUTERISED RADAR PROCESS FOR MEASURING DISTANCES AND RELATIVE SPEEDS BETWEEN A VEHICLE AND OBSTACLES LOCATED IN FRONT OF IT

[76] Inventors: Ernst Lissel, Grenzweg 13, D-38442 Wolfsburg; Hermann Rohling, Kirchheimer Strasse 11, D-38304 Wolfenbüttel; Wilfried Plagge, Gartenstrasse 10, D-38312 Ohrum, all of Germany

[21] Appl. No.: 492,079

[22] PCT Filed: Dec. 29, 1993

[86] PCT No.: PCT/EP93/03714

§ 371 Date: Oct. 10, 1995

§ 102(e) Date: Oct. 10, 1995

[87] PCT Pub. No.: WO94/16340

PCT Pub. Date: Jul. 21, 1994

[51] Int. Cl.$^6$ .................................................. G01S 13/00
[52] U.S. Cl. ........................... 364/461; 364/426.044; 180/169; 342/109
[58] Field of Search ................ 364/426.044, 461; 342/47, 70, 109, 127; 180/169

[56] References Cited

U.S. PATENT DOCUMENTS

| | | | |
|---|---|---|---|
| 4,450,444 | 5/1984 | Wehner et al. | 343/5 CM |
| 4,602,258 | 7/1986 | Sarfati | 343/13 R |
| 4,618,864 | 10/1986 | Martin et al. | 342/162 |

*Primary Examiner*—Michael Zanelli
*Attorney, Agent, or Firm*—Charles T. Silberberg; Tom Streeter

[57] ABSTRACT

A vehicle radar emits four groups of single-frequency stepped radar pulses. In group A, the frequency of each pulse is a fixed amount higher than that of the preceding pulse. In group B, the frequency of each pulse is a fixed amount lower than that of the preceding pulse. In group C, the frequency of each pulse is the same as that of the preceding pulse. In group D, the frequency of each pulse depends on a modulo algorithm. The signals reflected from other vehicles may readily be processed with inexpensive equipment to discriminate among such other vehicles, and to determine the distance to, and relative speed of, each such vehicle.

9 Claims, 6 Drawing Sheets

1

COMPUTERISED RADAR PROCESS FOR MEASURING DISTANCES AND RELATIVE SPEEDS BETWEEN A VEHICLE AND OBSTACLES LOCATED IN FRONT OF IT

BACKGROUND OF THE INVENTION

The invention relates to a computerised radar process.

Up to now, radar techniques for measuring distances and relative speeds have found their primary application in the field of air traffic. There, one is concerned with the determination of distances in a range extending from some hundreds of metres up to several kilometres. In contrast to this, the particular circumstances of road traffic require the determination of distances in a range extending from less than one metre up to more than a hundred metres. Moreover, the corresponding, autonomous safety devices and spacing-warning devices in a vehicle have to be able to simultaneously capture items of data which contain as much characteristic information as possible regarding the usually complicated and, in contrast to the flight paths for air traffic, concealed street scenes as well as the relatively many obstacles. In principle, one needs to register three types of data in order to obtain an indication as regards the magnitude of the obstacle, namely, the distance between a vehicle and the obstacle, the relative speed between a vehicle and the obstacle (by means of the Doppler-effect) and the amplitude of the transmit signal which is reflected by the obstacle.

A further requirement for a radar process that is to carried out autonomously in a vehicle is that it should be implemented in a cost-effective manner as otherwise any mass utilisation would not be economically viable. As investigations undertaken within the framework of the invention have shown, known radar processes, which simultaneously permit measurements of the distance and relative speed and the detection of a plurality of obstacles (Kleinheubacher Reports 1992, Vol 35, pages 731 to 740), can only be realised at extremely high cost in these respects since large difference frequencies ensue by virtue of the steep frequency gradients and the bandwidth which has to be processed (in the upper MHz range) is too great for commercial signal processors.

SUMMARY OF THE INVENTION

Accordingly, the object of the invention is to develop a computerised radar process which process is able to simultaneously determine, in respect of a plurality of obstacles, the distances, the relative speeds and the amplitude of the reflected signal as a measure for the magnitude of the obstacles.

Thus, in the radar process in accordance with the invention, which is intended to be effected by means of a commercial signal processor without any manual intervention, test signals, in the form of the reflected transmit signals and which are detected in accordance with an intrinsically known method (the reflection of radar signals), are altered in a deliberate manner, namely, in conformity with a particular set of rules that ensure the fulfilment of the requirements formulated in the above statement of object when using simple devices. Hereby, the process embodies new modulation steps as well as a new way of evaluating the reflected signals that are received. One special feature of the modulation process consists in that the radar signals are composed of bursts i.e. chunks of constant frequency, the number of which is determined by the desired precision of the measurement. During the first three measurements, a number of 128 bursts has proved to be useful whereas for the fourth measurement, it was a number of 36 bursts. The length in time of such a burst expediently amounts to approximately 20 µs; all of the signals reflected by the obstacle are detected once this period of time has elapsed, i.e. the received signal for the relevant transmit signal burst is in a steady state condition since the transmitted signal was in the form of a pure sine wave. This enables a complex sample to be taken at the end of each received reflected burst, which sample contains the steady state phase of the transit time waveform of the reflection. For a burst length of 20 µs, this would correspond to a sampling frequency of 50 kHz which, in advantageous manner, is thus relatively very low.

The process in accordance with the invention envisages a total of four method steps or measurements for the processing of the received reflected signals. Hereby, the first three measurements serve for the detection of the obstacles, which is provided by the number of transmit signal bursts and the number of distance and relative speed windows, while in the fourth measurement, from the potential obstacles which have been determined in the first three measurements, the phantom or apparent obstacles—resulting from the evaluation—are separated out so that thereafter only the items of data for the actually existing obstacles have to be further processed.

An embodiment of the invention will be explained hereinafter with the help of the drawing, FIG. 1 of which shows the basically, intrinsically known construction of a radar equipment such as can also be made use of for the process in accordance with the invention, while the other FIGS show curves and diagrams for explaining the different steps of the method and the calibration process.

BRIEF DESCRIPTION OF THE DRAWINGS

FIG. 12 shows a gaussian cloud sample produced by the quadrature mixer of FIG. 1, as would be produced if there were no phase or amplitude errors.

DETAILED DESCRIPTION OF THE DRAWINGS

Figure 1:
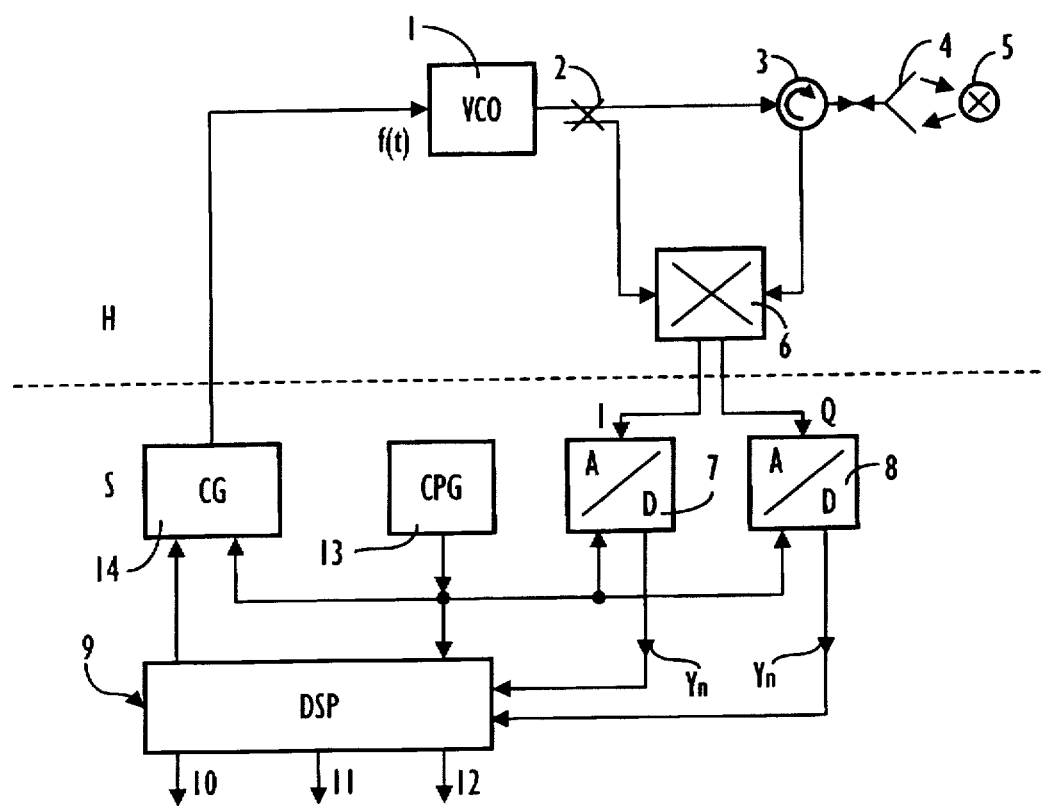
FIG. 1 is a schematic drawing of the present invention.

If one firstly considers the block circuit diagram in accordance with FIG. 1, then the equipment is sub-divided into the high frequency or microwave section H and the signal processing section S. In the process in accordance with the invention, the voltage controlled oscillator (VCO) 1. Which in the usual manner generates a continuous microwave signal (continuous wave) whose frequency can be varied over several 100 MHz in proportion to a control modulation voltage f(t) by means of, for example, a varactor diode, serves for generating respective constant frequency transmit signal bursts which are extended to the transmitting and receiving antenna 4 via the coupler 2 and the circulator 3 whose operational direction is indicated by the arrow. An obstacle located on the roadway in front of the vehicle equipped with this equipment is referenced by 5. The paths of the transmit signal bursts and of the reflected signals are indicated by arrows.

The circulator 3 separates the transmit signals from the received reflected signals so that only the reflected signals reach the righthand input (as seen in the FIG.) of the quadrature mixer 6, while transmit signals coupled out by the coupler 2 are supplied to its lefthand (as seen in the FIG.) input. The mixer 6 forms the difference frequency between the transmit and received signal as an in-phase signal I and a quadrature phase signal Q which initially, are both in analogue form i.e. in the form of sinusoidal time signals. A conversion into digital signals $y_n$ occurs in the analogue-digital converters 7 and 8 and the digital signals are supplied to the digital signal processor (DSP) 9—whose manner of operation will be described later—from whose outputs 10, 11 and 12, signals relating to the instantaneous distance, the relative speed and the amplitude i.e. the magnitude of the obstacle, can then be extracted.

For its part, the signal processor 9, with which the clock pulse generator (CPG) 13 is associated, serves for generating the control voltage f(t) for the oscillator 1 via the code generator (CPG) 14.

Figure 2:
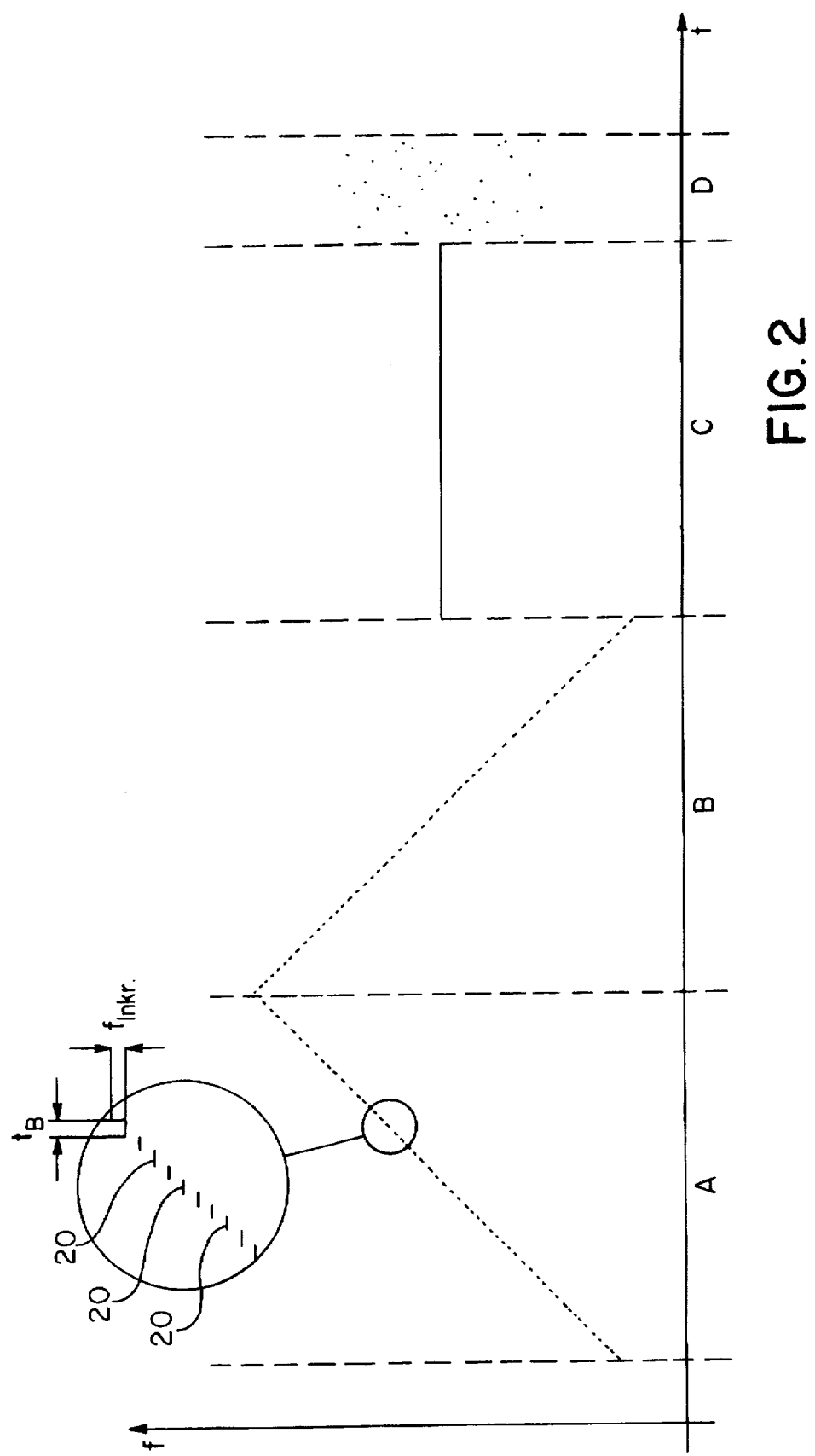
FIG. 2 is a graph of frequency versus time of the signals transmitted by the apparatus of FIG. 1.

In the following description of the process in accordance with the invention, the requirement that a distance range of 128 metres should be determinable with a resolution of one metre will be assumed as an example. A sub-division of the relative speed range that is to be captured into 128 windows is likewise assumed. There is thus apparently a requirement to process 128×128 windows, which is something that would not only lead to scarcely acceptable computation costs but also to a relatively long computation time, in any case, of over 10 msec. For this reason, the process in accordance with the invention according to FIG. 2, in which the transmit frequency f is plotted against the time t, envisages three measurements A, B, and C in which the obstacles are detected as well as a subsequent fourth measurement D which serves for sorting cut the apparent obstacles that are thereby produced.

As already mentioned, the process in accordance with the invention functions by generating respective constant frequency transmit signal bursts which are made use of during the measurements A, B and C. A sequence of bursts 20 of this type is illustrated in enlarged manner in FIG. 2, their duration $t_B$ amounting to 20 μsec in the assumed example and which define frequency increments $f_{Inkr}$ of 1 MHz in this example. As likewise already explained, the use of transmit signal bursts 20 of this type enables the reflected signals to be evaluated in the steady state phase.

All four measurements A, B, C and D are effected in sequence, i.e. the measurement A occurs first for all 128 bursts 20 in the equipment in accordance with FIG. 1, then, in corresponding manner, the measurement B and so on. During the measurement A, the oscillator 1 is controlled by an appropriate control voltage f(t) such that it generates a sequence of bursts 20 which, starting from a lowest frequency of 77 GHz in this example, increases in a linearly incremental manner up to a maximum value of 77.128 GHz in this example. By contrast, starting now from the maximum frequency, the oscillator 1 generates a linear sequence of bursts having the opposite slope during the measurement B, so that the frequency of 77 GHz is eventually arrived at once more. In contrast to this, the transmission of 128 bursts all having the same frequency occurs during the measurement C.

Figure 3:
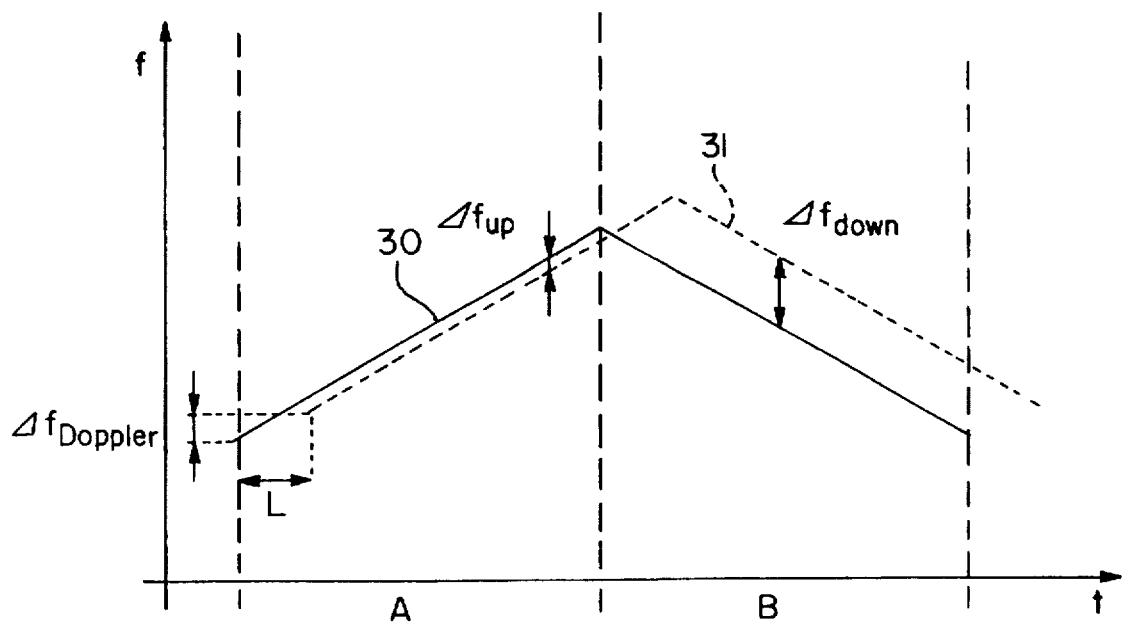
FIG. 3 is a graph of frequency versus time of the signals transmitted by, and received into, the FIG. 1 apparatus during the first portion of the period shown in FIG. 2.

The reflected signals received during the first three measurements A, B and C are respectively weighted by a Blackman-cosine window and entered into a Fourier transformation (FFT). As presented in detail in "Introduction to Radar systems" by M. I. Skolnik, 1962, at page 88, the first two measurements A and B enable the simultaneous measurement of the distance and the relative speed for an obstacle which is conspicuous by virtue of a high intensity of reflection. The waveforms 30 of the transmit signals and 31 of the received reflected signals are reproduced in a frequency (f)—time (t) diagram in FIG. 3. The echo transit time is referenced by L, the Doppler frequency by $\Delta f_{Doppler}$. From these, as well as from the frequency differences $\Delta f_{up}$ and $\Delta f_{down}$, there now result the relationships for the relative speed and the distance or separation $$\Delta f_{Doppler} = (\Delta f_{down} - \Delta f_{up})/2$$

$$\Delta_{separation} = (\Delta f_{down} + \Delta f_{up})/2$$

Measurement C now takes account of the fact that the measurements A and B cannot be used for more than one obstacle as a result of the ambiguity inherent in the mathematical relationships.

In the assumed example, each of the Fourier transformations executed on the thus received reflected signals following the three measurements A, B and C delivers 128 "spectral values". Here, the projecting maxima occurring in the output cells of the Fourier transformation are caused by reflections from the obstacles. The relationships indicated above in connection with FIG. 3 apply in respect of the first and second measurement; the frequencies denoted by the maxima are equal to the double frequencies of the obstacles in measurement C.

The frequencies determined during the three measurements A, B and C are identified in a speed—separation diagram (FIG. 4) by families of intersecting straight lines which respectively represent the positions of potential obstacles. The straight lines 40 and 41 relate to the first measurement A, the straight lines 42 and 43 to the second measurement B and the straight lines 44, 45 and 46 to the third measurement C. After logically combining the test results of the first three measurements, only the points of intersection of the straight lines 40 to 46 come into question as being potential obstacles. Hereby, it may be a matter of actual obstacles 47, 48 and 49 but could also be a phantom obstacle 50 which was evoked by the logical combination process. Accordingly, the first three measurements A, B and C deliver items of data for a defined number of potential obstacles which has been reduced relative to the number of original increments and now, a means for sorting out the phantom obstacles has to be developed with the aid of the fourth measurement D.

Basically, this is effected in that the potential obstacles detected by the measurements A, B and C as the points of intersection are checked by means of a defined frequency modulation or frequency coding as to whether they are real obstacles or phantom obstacles. For this, successive bursts having frequencies fn are generated by means of the oscillator 1 in accordance with the relationship $$f_n = f_T + f_{Inkr} * (A^n \bmod(P))$$

where n=0 ... N−1 with N=P−1 and P=a primary number,

A=a natural number which is selected for the currently effective length N such that N different coefficients occur, $f_T$=the carrier frequency of the oscillator, $f_{Inkr}$=the frequency increment, mod=the modulus operator and, at the end of each reflected burst—respectively associated with one of the coefficients ($A_n \bmod(P)$), a complex sample is calculated as a fourth received signal $$y_n = \Sigma k_i * e^{j\phi i;n}$$

where i=the number of obstacles, $\_\Delta\phi i;n = 2\pi f_{Inkr} R_i/c/2 \; (A^n \bmod(P)) + 2\pi n * v_i f_T/(c/2 \; f_A) =$ the steady state phase value of the obstacle i, c=the velocity of light, $R_i$=the distance from the target obstacle i;

$v_i$=the relative speed of the obstacle i, $f_T$=the carrier frequency of the oscillator, $f_A$=the sampling frequency, $k_i$=the amplitude.

Figure 4:
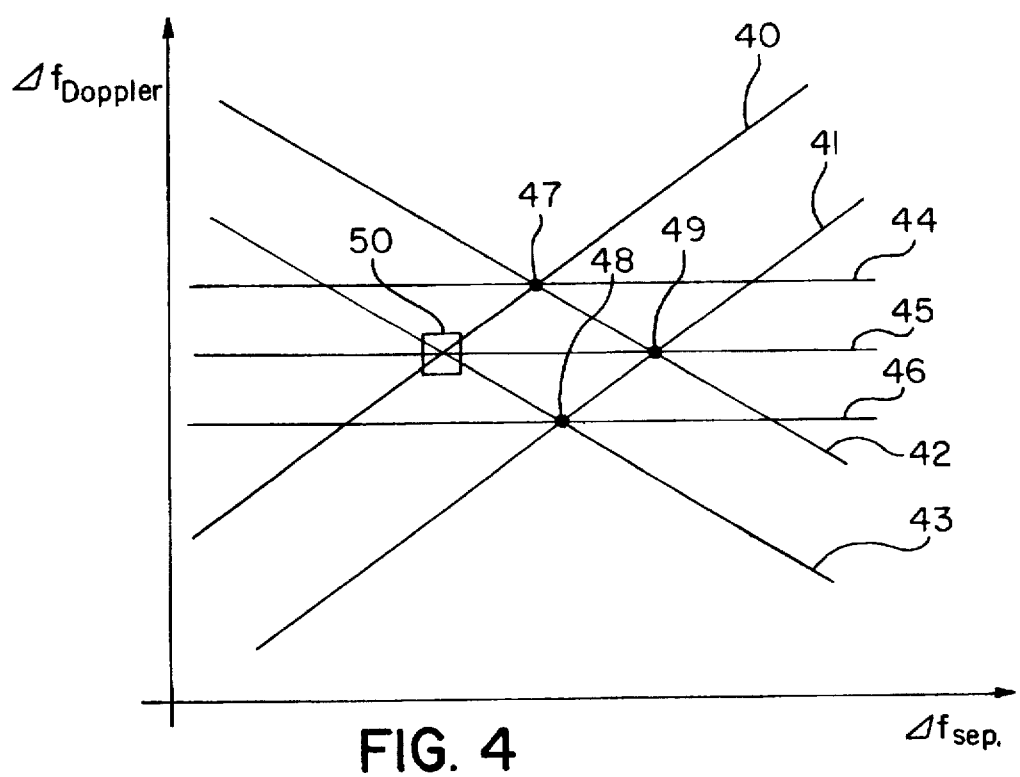
FIG. 4 is a graph of Doppler-difference-frequency versus separation-difference-frequency derived from the measurements shown in FIG. 3.

Thereafter, there occurs a comparison of the phases $\phi i;n$ associated with the obstacles during the fourth measurement with the phases of the points of intersection 47, 48, 49 and 50 in the relative speed—distance diagram of FIG. 4.

In order to simplify comprehension, the following numerical example is assumed for the frequency coding $y_n$:

P=37; N=P−1=36; A=5;

$f_T$=77 GHz; $f_{Inkr}$=1 MHz.

The individual coefficients ($A^n \bmod(P)$) are then: 1; 5; 25; 14; 33; 17; 11; 18; 16; 6; 30; 2; 10; 13; 28; 29; 34; 22; 36; 32; 12; 23; 4; 20; 26; 19; 21; 31; 7; 35; 27; 24; 9; 8; 3; 15.

These coefficients cover all the natural numbers between 1 and 36 and are all different from one another. When multiplied by the frequency jump increment, here 1 MHz, they produce the modulation waveform illustrated in region D in FIG. 2: One obtains a constant frequency burst for each of the coefficients and, at the end of each burst, a received sample in the form of signals which are referenced I and Q in FIG. 1. However, as a departure from the bursts obtained during the first three measurements A, B and C, the bursts obtained during the fourth measurement D do not form a linear burst sequence.

Now, the defined sequence of coefficients ($A^n \bmod(P)$) has special mathematical properties which form the basic prerequisites for use in the radar system:

1. if one multiplies the sequence by an arbitrary whole number other than 0 and returns the resultant sequence to the range 1 ... N by modulo calculation, there then results a cyclically displaced version of the sequence. If one considers the above example, there results the sequence 2; 10; 13; 28; 29; ..., which is a cyclically displaced version of the original sequence, when the sequence indicated there is multiplied by the number 2 and subsequently returned to the range 1 ... 36 by mod(37).

2. if one subtracts a cyclically displaced version of this sequence from the sequence of coefficients and returns the result once more to the range 1 ... N by a modulo calculation, there then results another cyclically displaced version of the sequence. In the example: the sequence 2; 10; 13; 28; 29; ... is subtracted from the sequence 1; 5; 25; 14; 33; .... There thus results the cyclically displaced version 36; 32; 12; 23; 4; ....

As is immediately apparent from the law of formation indicated above for the received signal Yn of the fourth measurement D, this received signal is composed by virtue of the superimposition of a plurality of reflection processes at obstacles which have been received, weighted by different reflection amplitudes $k_i$, and which each include the steady state phase values $\phi i;n$ along the discrete time axis n. If one inserts the values from the above numerical example into the relationship for $\phi i;n$ and assumes a sampling frequency of 50 kHz, there then results $$\phi i;n = 2\pi/37.^{R \cdot i}4 \text{ metre}(5^n \bmod(37)) + 2\pi n * v_i(km/h)/(360 \; km/h).$$

The first, separation or distance dependent summand thus produces distributed phases in the complex plane. Since the distance enters as a multiplier in these phases and a modulo effect is produced by the cyclical periodicity of the phase with reference to 360 degrees, there results, in accordance with the pre-requisite defined in 1. above and in dependence on the distance, a cyclically displaced version of the phase sequence.

The potential obstacles obtained by means of the first three measurements A, B and C are now ordered into a sequence having decreasing reflection amplitudes $k_i$ and, for the purposes of sorting out the phantom obstacles, are multiplied by a correlator matched to the assumed distance—speed vector; thereafter, the products are added:

The correlation value W for the obstacle having the largest reflection amplitude is calculated first of all:

$$W = N^{-1} \Sigma_{n=0} y_n * e^{-j\phi i;n}$$

using i=0 (the target having the strongest amplitude). Thus, in accordance with this correlational relationship, a conjugate complex sequence, which is matched to the potential obstacle having the strongest reflection amplitude, is multiplied by the received signal $y_n$ of the fourth measurement D. This means, that the corresponding phase sequence is subtracted. A higher correlation value W can only occur for a real obstacle since it is only then that the received phase sequence $y_n$ can be turned once more into a phase constant sequence by the correlation. No such type of phase sequence is present in the received signal $y_n$ for a phantom obstacle and the weighting by the correlation produces cyclically displaced versions of the phase sequence in accordance with the mathematical property indicated under 2 above because of the further potential obstacles. The sum of such phase scattered vectors i.e. the appertaining correlation value W, is very low so that apparent obstacles can be recognised as such and sorted out.

Thus, in the diagram according to FIG. 4, the point of intersection 50 is sorted out and the associated remaining points of intersection 47, 48 and 49 are treated as real obstacles. This is done in an iterative manner whereby, on each occasion following the detection of a point of intersection having a high correlation value W, thus here, the points of intersection 47, 48 and 49, one reverts to the appertaining, fictitious fourth received signal $W/N * e^{j\phi i;n}$ and subtracts it from the received signal $y_n$ of the fourth measurement:

$$y_{n_{new}} = y_n - W/N * e^{j\phi i;n}$$

for all n=0, ... N−1.

Thus, this difference only includes the reflected signals from the second largest target onwards. This procedure is, as mentioned, repeated iteratively so that a correlation check for the currently largest target (i.e. collectively, the second largest) is carried out once more with the aid of this new received signal $y_{n_{new}}$; this method of procedure is repeated as appropriate.

Thus, in a word, one could say that, for real obstacles, the phase of the received signal associated with the appertaining point of intersection in the diagram in accordance with FIG. 4 is calculated in the manner of an inverse Fourier transformation and compared with the result of the fourth measurement D. As there are complex values present, this check is effected in accordance with a correlation function; then, the correlation values only have the resultant 36 if a real obstacle is present.

Following the described iterative check of all of the potential obstacles detected by the measurements A, B and C, then, to a high degree of certainty, it is only the actual obstacles that are available after the fourth measurement D; the false alarm rates in respect of phantom obstacles are extremely low.

In principle, it would be possible to determine the distances and relative speeds by means of the fourth process step D alone, even if a plurality of obstacles were present. However, for a sufficiently great resolution, this would result in computation times which would be so long that a real-time utilisation of the process would not be possible. It is for this reason that a preselection of the potential obstacles is established by means of the first three process steps A, B and C and the fourth process step D is then utilised on the thus reduced number. The consequence of this, is a process which can cope using computers of conventional capacity and which guarantees positive detection of obstacles within a very short evaluation time period.

In order to increase the precision still further, the calibration process described hereinafter may be used. This is to say that, since the quadrature mixer 6 for generating a complex signal I, Q includes two mixers, this signal could, in essence, be falsified by virtue of two effects, namely an "offset error" caused by a crosstalk signal and one caused by a "quadrature component error".

The occurrence and the compensation of the offset error will be described hereinafter: The amplitude of the transmit signal fed into the quadrature mixer 6 and hence the response sensitivity of its mixer diodes are dependent on the instantaneous frequency, as set by the control voltage f(t) so that the transmit signal is also directly available at the output of the quadrature mixer 6.

This "cross-talk signal" is extremely strong in comparison with the actual received signal (i.e. the reflected signal) so that the targets or obstacles to be detected are, so to speak, concealed. Here, the difference in levels between the two types of signal may amount to 40 ... 100 dB in dependence on the magnitude and distance of the target. The "cross-talk signal" is referred to here as an "offset error" since, at a particular frequency, it occurs to a large extent as a static offset of the output signal on a mixer diode.

The fluctuation range of the defined offset only comprises a very small range of amplitudes; in addition to this, the fluctuations have a long time constant (of some minutes) while the received signal, which is superimposed on the offset, has, from measurement to measurement, a stochastic characteristic at the frequency considered. Consequently, the offset error can be determined very precisely by forming the average value, at the same respective frequency, of a large number of reflected signals. This process advantageously takes place continuously during the operation of the radar system. Once the offset error is sufficiently well known, it can be corrected for each frequency, in that it is simply subtracted from the output signal I, Q of the mixer.

Figure 5:
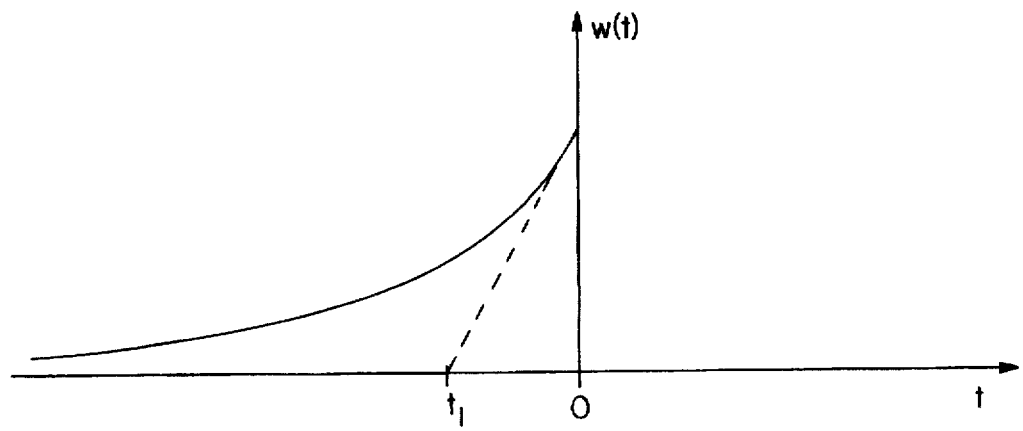
FIG. 5 is a graph showing the derivation of the exponential time-decay constant $t_1$.

The formation of the average value of the reflected signals at a particular frequency is advantageously effected not in terms of the arithmetic mean but rather by virtue of an exponentially decaying historical weighting process w(t) which is illustrated in FIG. 5 plotted against time t (the value t1 on the abscissa implies several minutes). As opposed to the arithmetic mean, the average value calculated by means of such a historical weighting process has three basic advantages: Firstly, the calculated average value can rapidly follow any drifting of the error since the new reflected signals are weighted more heavily than the older ones. Secondly, the average value is characterised by a very low degree of scatter since, in toto, there are a lot of signals contributing to the average. Thirdly, such a historical weighting process can be easily implemented: the most recently calculated average value for a particular frequency f is refreshed by means of a simple recursive rule at the time point of the recurrence of this frequency f. This rule is explained hereinafter.

To a large extent, the instantaneous average offset value $Re_{new}(f)$, $Im_{new}(f)$ (Re=the real part, Im=the imaginary part) at the frequency f is calculated from the last average offset value $Re_{old}(f)$, $Im_{old}(f)$ at the same frequency, added to a small component of the new sample $Re_{new}(f)$, $Im_{new}(f)$;

$$Re_{new}(f)=(1-Z)*Re_{old}(f)+Z*Re_{new}(f);$$

$$Im_{new}(f)=(1-Z)*Im_{old}(f)+Z*Im_{new}(f);$$

$Z<<1$.

Figure 6:
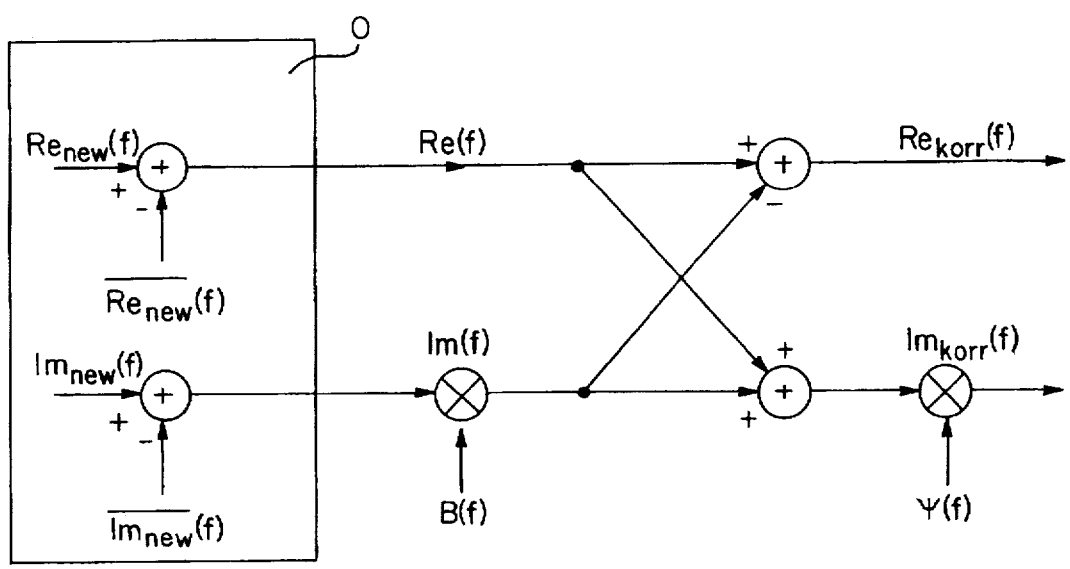
FIG. 6 is a schematic diagram of the apparatus used to exponentially smooth the reflected signal using the time constant shown in FIG. 5.

A diagram for the whole calibration means is illustrated in FIG. 6. The real and imaginary parts for a frequency f are indicated there. The offset correction 0 for the signal coming from the mixer diodes is symbolised, in the left hand part of this FIG., by the subtraction of the average offset value.

Figure 7:
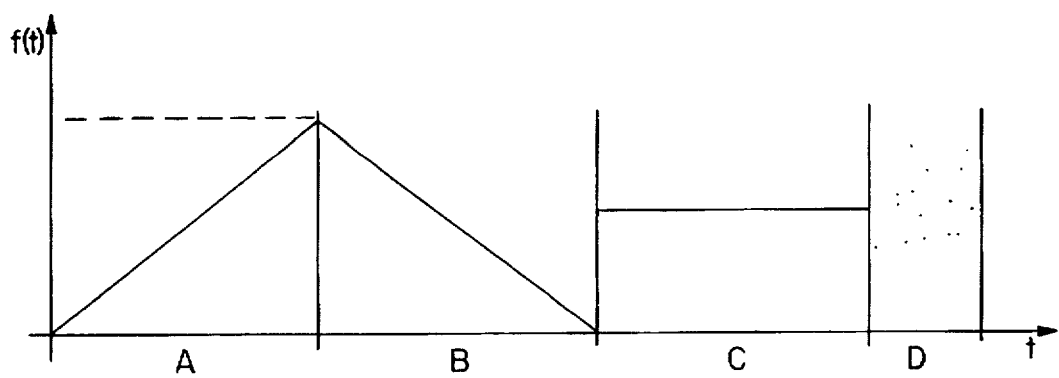
FIG. 7 recapitulates FIG. 2.
Figure 8:
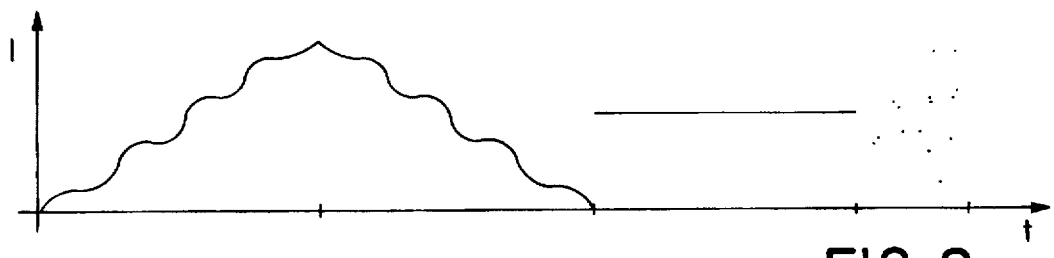
FIGS. 8 and 9 respectively show the in-phase and quadrature phase signals delivered from the quadrature mixer of FIG. 1, without calibration from exponential smoothing.
Figure 9:
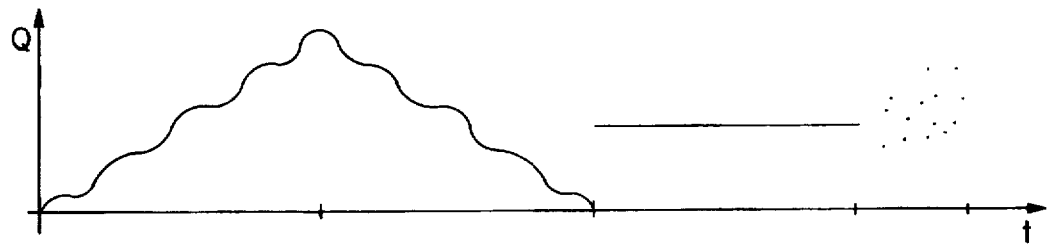
Figure 10:
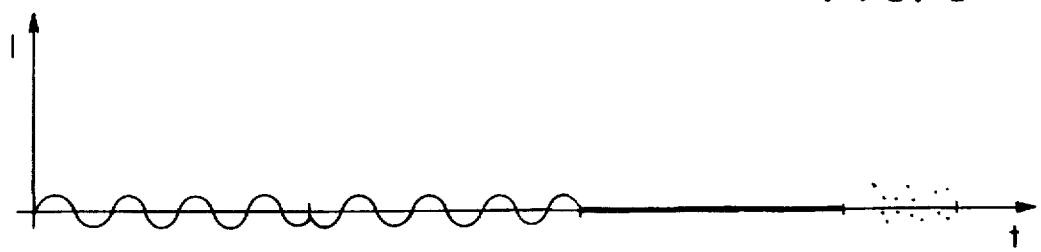
Figure 11:
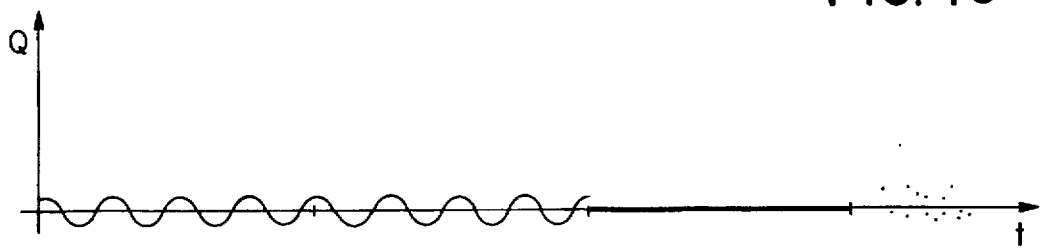
FIGS. 11 and 12 respectively show the in-phase and quadrature phase signals delivered from the quadrature mixer of FIG. 1, with calibration from exponential smoothing.

The FIGS. 7 to 11 show the effect of this calibration: FIG. 7 shows once more the time—frequency waveform from the measurements A to D of FIG. 2. For a non-moving obstacle at a distance of 4 m for example, the quadrature mixer 6 (see FIG. 1) delivers the signal waveforms in accordance with the FIGS. 8 and 9 without any calibration, but, by contrast, in accordance with FIGS. 10 and 11 when using the calibration process described.

The updating of the average offset value can always be effected by means of the recursive computational rule when a particular frequency value (burst) recurs. However, the duration of the recurrence is different in the selected modulation characteristic in accordance with FIG. 2. Consequently, the total time of measurement for the four individual measurements A–D (see FIG. 2) is selected as the updating period $T_{AK}$ for the evaluation of a radar picture in order that every frequency be treated under the same conditions. The constant Z has to be selected in accordance with the desired time constant τ korr for the exponentially decaying historical weighting process:

$$Z=T_{AK}/\tau_{korr}.$$

for example, the total duration of the radar evaluation process amounts to 10 ms, then for a recursive time constant of $\tau_{korr}=10s$, there results the value Z=0.001; i.e. the instantaneous average offset error is calculated as being composed to 99.9% from the previous average offset error added to 0.1% of the instantaneous received signal.

The quadrature component error of the quadrature mixer 6 is characterised by an amplitude and a phase error component.

If one considers the amplitude error first, this is characterised by the different response sensitivities of the mixer diodes of the quadrature mixer 6 for a same HF power performance. For the correction of the amplitude error, the relationship B(f), which represents the quotients from the average value amounts of the real part and the imaginary part following an offset correction, is of significance. Since the quantity B(f) is frequency dependent, it is continuously determined for each frequency during the receiving operation of the radar system just as for the correction of the offset error:

$$B(f)=Re(f)/Im(f)$$

The two average value amounts Re(f), Im(f) (the average values of the amounts) are calculated by means of the above mentioned method of exponentially decaying historical weighting.

For the correction of the amplitude error, the thus determined factor B(f) is multiplied by the imaginary part Im(f) (see FIG. 6).

Figure 12:
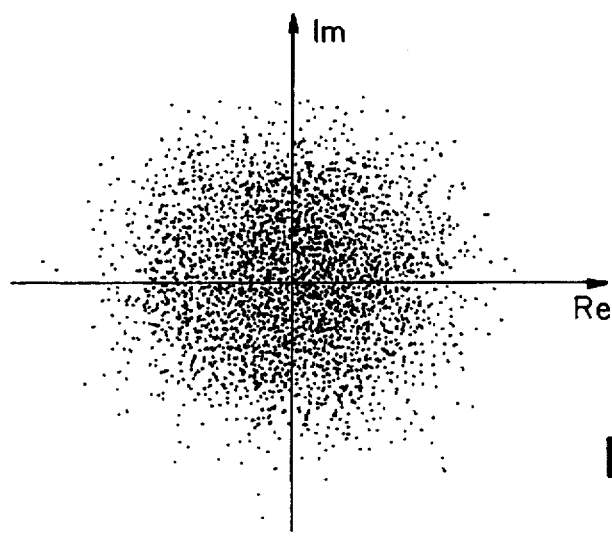
Figure 13:
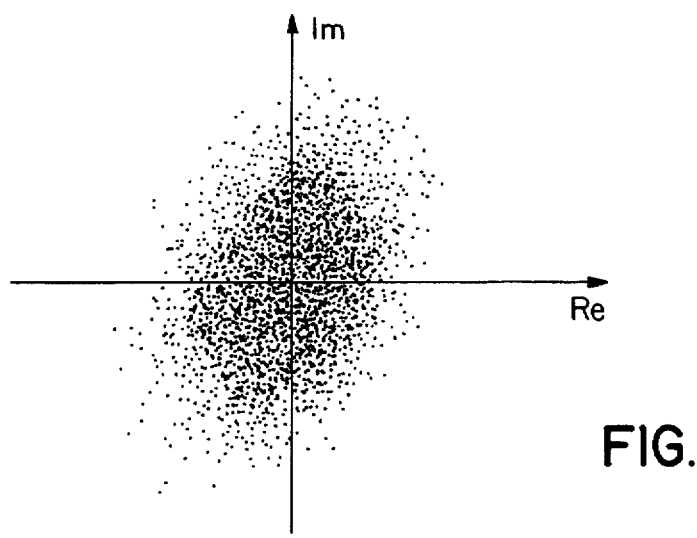
FIG. 13 shows the same gaussian cloud with such errors.

After the amplitude error in the quadrature components has been corrected, there remains the phase error. This indicates the deviation from the phase value 90° of the two signals that have to be fed into the mixers. The illustration in FIG. 12 should be viewed as regards the effect of such a phase error:

Approximately 1000 respective samples of an assumed exemplary received signal are plotted in the spatial diagram in FIG. 12. Here, only samples in respect of a particular recurring frequency have been selected. On the presumption that the target situation is not static in such a way that the distances vary by less than a fraction of a HF wavelength (approx 4 mm) in the course of a few minutes, then the greater part of the received signals exhibit a stochastic nature. The stochastic nature can be perceived in the spatial diagram in the form of a two-dimensional gaussian cloud; i.e. an arbitrary cross-section of such a cloud taken through the origin of the co-ordinate system produces a gaussian density-distribution function when viewed unidimensionally.

Figure 14:
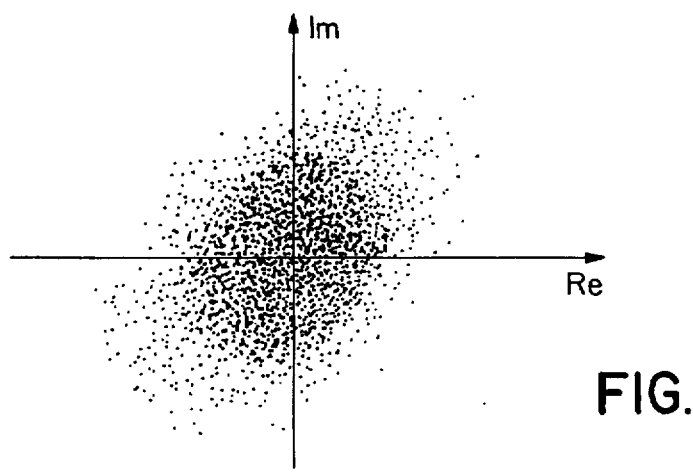
FIG. 14 shows the cloud when amplitude errors have been removed, but phase errors remain.

The diagram in accordance with FIG. 12 shows a concentric "cloud" as it appears when there are no phase and amplitude errors at the output of the quadrature mixer 6. The diagram in accordance with Picture 13 includes the result for a quadrature mixer that is subject to error. When viewed over a long period, one can perceive the elliptical expansion of the cloud, initially this being along an arbitrary axis since amplitude and phase errors are present here. Following the amplitude correction process described above, the phase errors remain; the elliptical expansion now, however, only occurs at an angle of 45 degrees (see FIG. 14).

Since the directional axis of the ellipse lies definitively at 45 degrees, all of the received values are turned through 45 degrees in order to eliminate this phase error so that the elliptical directional axis now occurs at an angle of 90 degrees. This rotation is effected, as is illustrated in FIG. 6, by means of a crosswise addition or subtraction of the quadrature components. In so doing, the amplitude of the signals is of course increased additionally by √2, however this change in the amplitude does not have any deleterious effects but rather, merely enters as a normalising constant in the processing procedure.

Following the 45° rotation of the ellipse, the long-side ratio can be determined by virtue of the quotient ψ(f) which results from the division of the average value amount of the real part by the average value amount of the imaginary part. This, however, corresponds to the same manner of procedure as for the amplitude correction since the phase errors in the quadrature components have been turned into amplitude errors by virtue of the 45 degree rotation. Consequently, the correction of the phase error too, occurs, in correspondence with the amplitude correction, by multiplication of the imaginary part by the factor ψ(f) (see FIG. 6).

All of the correction measures for the signal yn coming |out for the| from the A/D converters 7 and 8 up to the final, virtually ideal received signal Re(f), $Im_{korr}$(f) are illustrated in Picture 6. The question arises as to whether, and in how far, the individual correction measures mutually interfere or even lead to "oscillations in the rules".

The amplitude correction and the phase correction of the quadrature components have no effect upon one another since they are mutual orthogonal.

However, the offset correction and the correction of the quadrature components are mutually interfering because, for example, an insufficiently balanced-out offset error may lead to a falsification of the amplitude correction. Consequently, the time constant $\tau_{korr}$ for the offset correction is made lower by approximately a factor of 10 than that for the correction of the quadrature component error.

Thus, the invention relates to a computerised radar process for measuring the distances and relative speeds between a vehicle and a plurality of obstacles located in front of it, wherein a positive distinction between real obstacles and apparent obstacles is achieved within a short evaluation time period by means of four procedural steps (A, B, C, D). The basic feature of the first three procedural steps (A, B, C) is the transmission of respective constant frequency bursts 30 which, in a frequency—time diagram, form a linearly increasing sequence, a linearly falling sequence and a frequency-constant linear sequence. At the end of each reflected burst, i.e. in the steady state phase, a complex sample is registered and potential obstacles are determined in a relative speed—distance diagram as the points of intersection of straight lines which are obtained from the reflected linear burst sequences, and then, by means of a special correlation process, the phantom obstacles are sorted out in the computer and only the received values for the remaining obstacles are further processed.

We claim:

1. A process comprising the steps of:
    (a) generating transmit signals by means of an oscillator mounted on a vehicle, the transmit signals comprising a plurality of pulses, each pulse having a constant frequency;
    (b) transmitting the transmit signals from the vehicle;
    (c) reflecting the transmit signals from obstacles in front of the vehicle, thereby producing reflected signals which also comprise a plurality of pulses, each pulse having a constant frequency;
    (d) receiving the reflected signals; determining a complex sample at the end of each reflected pulse; and
    (f) positively distinguishing between real obstacles and apparent obstacles within a short evaluation period by distinguishing between different complex signals from different obstacles.

2. A process comprising the steps of:
    (a) generating transmit signals by means of an oscillator mounted on a vehicle;
    (b) transmitting the transmit signals from the vehicle;
    (c) reflecting the transmit signals from obstacles in front of the vehicle, thereby producing reflected signals;

(d) receiving the reflected signals;

(e) mixing the received reflected signals with the transmit signals to obtain mixed signals;

(f) obtaining in-phase and quadrature phase signals from the mixed signals;

(g) determining a cross-talk signal by forming an average value of received reflected signals for all frequencies of the oscillator which are determined by a control voltage thereof;

(h) subtracting the cross-talk signal from the in-phase and quadrature phase signals to produce modified in-phase and quadrature phase signals;

(i) processing the modified in-phase and quadrature phase signals into output signals relating to the distances and relative speeds between the vehicle and the obstacle.

3. The process of claim 2, wherein the step of forming an average value includes the step of forming a floating average value having an exponentially decaying historical weighting.

4. The process of claim 3, wherein the step of forming a floating average value includes the step of recursively determining, for a particular frequency, an updated average value by the steps of:

(a) multiplying a new sample by a small number Z to produce a weighted new sample;

(b) multiplying a last average value by 1-Z to produce a weighted last average value; and (c) adding together the weighted new sample and the weighted last average value to produce the updated average value.

5. The process of claim 4, wherein the processing step further comprises the step of removing a quadrature component error by the steps of:

(a) removing an amplitude error component by removing an average value of the in-phase and quadrature phase signals; and (b) removing a phase error component by phase rotating the in-phase and quadrature phase signals.

6. The process of claim 5, wherein the step of removing a phase error component by phase rotating the in-phase and quadrature phase signals comprises the steps of:

(a) cross-wise addition or subtraction between the in-phase and quadrature phase signals; and (b) multiplying the quadrature phase signal by the quotient of the average values of the in-phase and quadrature phase signals.

7. The process of claim 5, wherein:

(a) the step of determining the cross-talk signal uses a first time constant;

(b) the step of removing a quadrature component error uses a second time constant; and (c) the first time constant is greater than the second time constant.

8. A process comprising the steps of:

(a) generating transmit signals by means of an oscillator mounted on a vehicle, the oscillator being controlled to generate successive transmit pulses which:

(1) during a first measurement, have frequencies which increase in linear increments from a minimum value to a maximum value, the number of transmit pulses corresponding to a desired resolution;

(2) during a second measurement, have frequencies which decrease in linear increments from the maximum value to the minimum value;

(3) during a third measurement, have frequencies which are equal to one another; and (4) during a fourth measurement, have frequencies f(n) in accordance with the relationship:

(A) $f(n)=FT+FI*((A^n)mod(P))$ where;

(B) $n=0, \ldots, N-1$;

(C) $N=P-1$;

(D) P=a primary number;

(E) A=a natural number selected for the currently effective length N such that N different coefficient occur;

(F) FT=the carrier frequency of the oscillator generating the transmit signals; and (G) FI=the frequency increment;

(b) transmitting the transmit signals from the vehicle;

(c) reflecting the transmit signals from obstacles in front of the vehicle, thereby producing reflected pulses;

(d) receiving the reflected pulses;

(e) determining a complex signal at an end of each received reflected pulse by:

(1) obtaining received signals, namely, in-phase and quadrature phase signals, from the received reflected pulse; and (2) mixing the received signals with the corresponding transmit pulse to obtain a frequency difference; and (f) processing the complex signals into output signals relating to the distances and relative speeds between the vehicle and the obstacle by (1) during the first, second, and third measurements, converting the received signals into relative speed and distance dependent frequency values by means of a Fourier transformation, whereby:

(A) the frequency values during first, second, and third measurements represent first, second, and third families of intersecting straight lines in a relative speed—distance diagram; and (B) points of intersection of the intersecting straight lines indicate potential obstacles;

(2) during the fourth measurement, (A) processing the received signal, which is a complex sample:

(1) $y(n)=\Sigma(i)[k(i)*exp(j\phi[i;n])]$ where:

(2) i=the number of obstacles, (3) $\phi[i;n]=2\pi*FI*RI/c/2*((A^n)mod(P))+2\pi n*VI*FT/(c/2FA)$ =the steady state phase value of the obstacle i;

(4) c=the speed of light;

(5) RI=the distance to the obstacle i;

(6) VI=the relative speed of the obstacle i;

(7) FT=the carrier frequency;

(8) FA the sampling frequency; and (9) KI=the amplitude of signal reflected from the obstacle i;

to recover the phases $\phi[i;n]$ associated with the obstacles i; and (B) comparing the phases $\phi[i;n]$ with the phases of the points of intersection in the relative speed—distance diagram.

9. The method of claim 8, wherein the phase comparing step farther comprises the step of:

(a) ordering the points of intersection into a sequence having decreasing reflection coefficients KI;

(b) correlating:

(1) the conjugate complex phase of the point of intersection having the largest amplitude with (2) the fourth measurement received signal y(n) in accordance with the functional relationship (3) $W = \Sigma(n=0 \text{ to } N-1) ( y(n)*\exp(-j\phi[i;n]))$;

(c) declaring the points of intersection whose correlation values W have been obtained in this way and which lie below a predetermined value to be phantom obstacles;

(d) reverting in an iterative manner to an appertaining fictitious received signal $W/N * \exp(-j\phi[i;n])$); and (e) subtracting the appertaining fictitious received signal from the fourth measurement received signal y(n).

* * * * *